United States Patent
Chen et al.

(10) Patent No.: US 11,451,466 B2
(45) Date of Patent: Sep. 20, 2022

(54) CONTROLLING ROUTE

(71) Applicant: NEW H3C TECHNOLOGIES CO., LTD., Hangzhou (CN)

(72) Inventors: Yan Chen, Beijing (CN); Wei Wang, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 399 days.

(21) Appl. No.: 16/606,730

(22) PCT Filed: Apr. 13, 2018

(86) PCT No.: PCT/CN2018/083003
§ 371 (c)(1),
(2) Date: Oct. 18, 2019

(87) PCT Pub. No.: WO2018/196633
PCT Pub. Date: Nov. 1, 2018

(65) Prior Publication Data
US 2020/0136955 A1 Apr. 30, 2020

(30) Foreign Application Priority Data
Apr. 25, 2017 (CN) .................. 201710277219.X

(51) Int. Cl.
*H04L 45/028* (2022.01)
*H04L 12/46* (2006.01)
(Continued)

(52) U.S. Cl.
CPC ........ *H04L 45/028* (2013.01); *H04L 12/4641* (2013.01); *H04L 45/42* (2013.01); *H04L 63/029* (2013.01); *H04L 63/0272* (2013.01)

(58) Field of Classification Search
CPC ... H04L 45/028; H04L 12/4641; H04L 45/42; H04L 63/0272; H04L 63/029; H04L 45/02; H04L 45/64; H04L 45/66; H04L 47/825
See application file for complete search history.

(56) References Cited

U.S. PATENT DOCUMENTS 9,900,250 B2 * 2/2018 Dong .................... H04L 45/586
10,142,129 B1 * 11/2018 Gupta ................ H04L 12/4641
(Continued)

FOREIGN PATENT DOCUMENTS

| CN | 101577875 A | 11/2009 |
|----|-------------|---------|
| CN | 101588240 A | 11/2009 |

(Continued)

OTHER PUBLICATIONS

ISA State Intellectual Property Office of the People's Republic of China, Written Opinion of the International Searching Authority Issued in Application No. PCT/CN2018/083003, dated Jun. 29, 2018, WIPO, 3 pages.
(Continued)

*Primary Examiner* — Kibrom T Hailu
(74) *Attorney, Agent, or Firm* — McCoy Russell LLP

(57) ABSTRACT

Disclosed are a method and a device for controlling an EVPN route. According to an example of the method, when receiving an EVPN route from a second VTEP device, a first VTEP device checks whether the EVPN route carries a role attribute. When determining that the EVPN route carries a role attribute and the carried role attribute is a specified first role attribute value, the first VTEP device controls the distribution of the EVPN route according to a set route synchronization control strategy.

17 Claims, 6 Drawing Sheets

(51) Int. Cl.
*H04L 45/42* (2022.01)
*H04L 9/40* (2022.01)

(56) References Cited

U.S. PATENT DOCUMENTS

| | | | |
|---|---|---|---|
| 2016/0021015 A1 | 1/2016 | Thoria et al. | |
| 2016/0285760 A1 | 9/2016 | Dong et al. | |
| 2017/0093834 A1* | 3/2017 | Natu | H04L 12/2852 |
| 2017/0317919 A1* | 11/2017 | Fernando | H04L 61/103 |
| 2019/0034226 A1* | 1/2019 | Gao | H04L 61/6022 |
| 2019/0036736 A1* | 1/2019 | Gao | H04L 61/6022 |
| 2021/0250294 A1* | 8/2021 | Wang | H04L 45/74 |

FOREIGN PATENT DOCUMENTS

| | | |
|---|---|---|
| CN | 101617305 A | 12/2009 |
| CN | 102624623 A | 8/2012 |
| CN | 103095578 A | 5/2013 |
| CN | 103634217 A | 3/2014 |
| CN | 104270298 A | 1/2015 |
| CN | 104283980 A | 1/2015 |
| CN | 104967620 A | 10/2015 |
| CN | 105099846 A | 11/2015 |
| CN | 106027396 A | 10/2016 |
| WO | 2016054974 A1 | 4/2016 |

OTHER PUBLICATIONS

State Intellectual Property Office of the People's Republic of China, Office Action and Search Report Issued in Application No. 201710277219.X, dated Nov. 6, 2019, 11 pages. (Submitted with Partial Translation).
European Patent Office, Office Action Issued in Application No. 18790554.2, dated Jun. 10, 2021, Netherlands, 7 pages.
Japanese Patent Office, Office Action Issued in Application No. 2019-558597, dated Jan. 5, 2021, 10 pages. (Submitted with Machine Translation).
European Patent Office, Extended European Search Report Issued in Application No. 18790554.2, dated Mar. 4, 2020, Germany, 11 pages.
ISA State Intellectual Property Office of the People's Republic of China, International Search Report Issued in Application No. PCT/CN2018/083003, dated Jun. 29, 2018, WIPO, 4 pages.

* cited by examiner

CONTROLLING ROUTE

CROSS-REFERENCE TO RELATED APPLICATIONS

The present application is a U.S. National Phase of International Patent Application Serial No. PCT/CN2018/083003 entitled "ROUTING CONTROL," filed on Apr. 13, 2018. International Patent Application Serial No. PCT/CN2018/083003 claims priority to Chinese Patent Application No. 201710277219.X filed on Apr. 25, 2017. The entire contents of each of the above-cited applications are hereby incorporated by reference in their entirety for all purposes.

TECHNICAL FIELD

The present disclosure relates to controlling route in network communication.

BACKGROUND AND SUMMARY

An Ethernet Virtual Private Network (EVPN), being an extension of a Virtual Private Local Area Network Service (VPLS) network, can solve the problem of unachievable load sharing in a Virtual eXtensible LAN (VXLAN). The EVPN employs a Border Gateway Protocol (BGP) as an upper-layer control protocol, thereby allowing for more flexible topology of a VPN.

In an EVPN, a VXLAN Tunnel End Point (VTEP) device on a provider backbone network (hereinafter referred to as "main VTEP device") may establish an EVPN instance and access different branches (hereinafter referred to as "site"); and synchronize an EVPN route received from a VTEP device (hereinafter referred to as "branch VTEP device") of one branch to branch VTEP devices of other branches to enable mutual access between different branches.

Taking an enterprise network for example, a VTEP device in headquarters (i.e., a main VTEP device) may be connected with a VTEP device in a first branch (i.e., a first branch VTEP device), a VTEP device in a second branch (i.e., a second branch VTEP device), and a VTEP device in a third branch (i.e., a third branch VTEP device). The first branch VTEP device may learn an ARP entry corresponding to a host in the first branch based on an Address Resolution Protocol (ARP) request sent by the host, and generate and synchronize an EVPN class-2 route corresponding to the host to the main VTEP device. The main VTEP device may synchronize the EVPN class-2 route corresponding to the host to the second branch VTEP device and the third branch VTEP device. Similarly, the main VTEP device, the first branch VTEP device and the third branch VTEP device may receive an EVPN class-2 route corresponding to a host in the second branch; also, the main VTEP device, the first branch VTEP device and the second branch VTEP device may receive an EVPN class-2 route corresponding to a host in the third branch. In this way, the headquarters may achieve mutual access with different branches and the different branches also may access each other.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

To illustrate more clearly the objectives, technical solutions and advantages of the present disclosure, the present disclosure will be described in detail in conjunction with the drawings and specific examples.

Figure 1A:
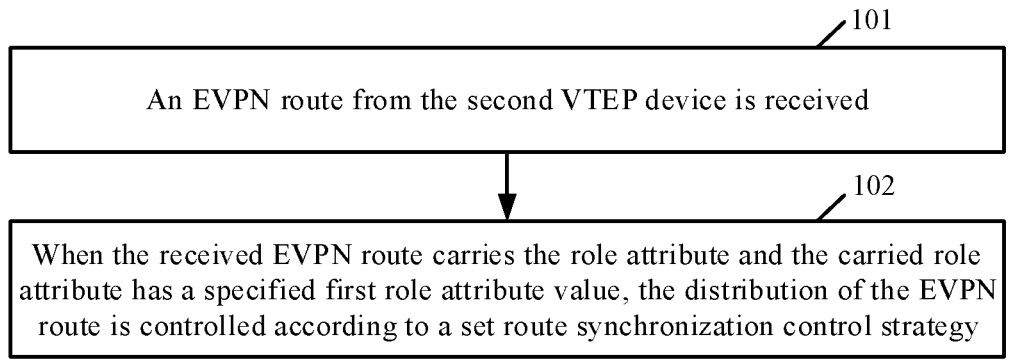
FIG. 1A is a flowchart illustrating a method of controlling a route according to the present disclosure.

FIG. 1A is a flowchart illustrating a method according to the present disclosure. The flow may be applied to a first VTEP device. Here, the first VTEP device is just named for being distinguished from a VTEP device to be mentioned below and not intended to define a particular VTEP device. In an example, the first VTEP device may be a main VTEP device applied in a backbone network, or a VTEP device playing a role of manager in an EVPN.

Figure 1B:
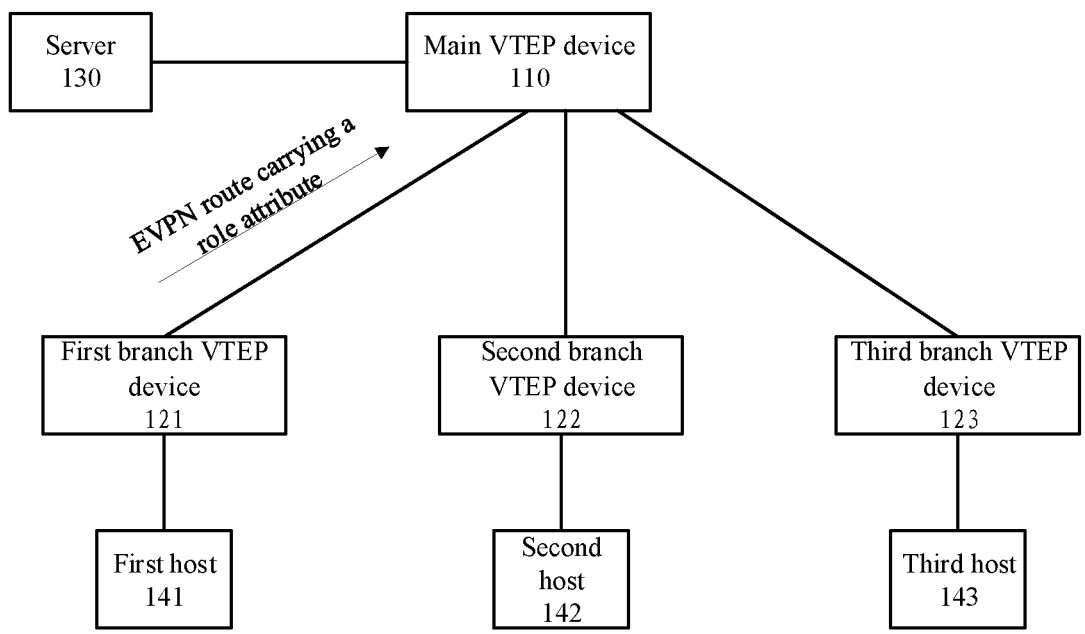
FIG. 1B is a schematic diagram illustrating an application network for the method shown in FIG. 1 according to the present disclosure.

With reference to FIG. 1B, the method illustrated in FIG. 1A will be described by taking a main VTEP device 110 as a first VTEP device and a first branch VTEP device 121 as a second VTEP device for example, where the main VTEP device 110 may be connected with a server 130, and all branch VTEP devices 121, 122, 123 may be connected with hosts 141, 142, 143.

As shown in FIG. 1A, the flow may include the following blocks.

At block 101, the first VTEP device 110 may receive an EVPN route from the second VTEP device 121.

Here, the second VTEP device is just named for being distinguished from the first VTEP device and a VTEP device to be mentioned below and not intended to define a particular VTEP device. In an example, the first VTEP device may be a main VTEP device applied in a backbone network, and the second VTEP device may be a branch VTEP device applied in a branch. In another example, the first VTEP device may be a VTEP device playing a role of manager in an EVPN, and the second VTEP device may be a VTEP device playing a non-manager role.

In the present disclosure, when receiving an ARP request from a host connected therewith, the second VTEP device may learn an ARP entry corresponding to the host according to the ARP request and generate a corresponding EVPN route. In an example, the EVPN route generated by the second VTEP device may be an EVPN class-2 route. The EVPN class-2 route may refer to a route (MAC/IP advertisement route) for advertising reachability of Media Access Control (MAC)/Internet Protocol (IP).

In an example, the EVPN route generated by the second VTEP device in the present disclosure may carry a role attribute of the second VTEP device. Here, the role attribute of the second VTEP device may be preconfigured in the second VTEP device according to a service requirement, and may also be dynamically determined by negotiation with another VTEP device specified in a network, for example, the first VTEP device, which will not be specifically limited in the present disclosure.

As can be seen from the above description, the EVPN route received by the first VTEP device 110 from the second VTEP device 121 at block 101 may carry the role attribute of the second VTEP device 121.

In an example of the present disclosure, the role attribute of the second VTEP device 121 may have a specified first role attribute value. When the role attribute of the second VTEP device 121 has the first role attribute value, it means that the distribution of the EVPN route from the second VTEP device 121 needs to be controlled, which can be seen in block 102.

At block 102, the first VTEP device 110 may check whether the received EVPN route carries the role attribute. When determining that the received EVPN route carries the role attribute and the carried role attribute has a specified first role attribute value, the first VTEP device 110 may control the distribution of the EVPN route according to a set route synchronization control strategy.

As can be seen from block 102, in the present disclosure, a precondition for the first VTEP device 110 to control the distribution of the EVPN route based on the set route synchronization control strategy is that the role attribute carried by the EVPN route has the first role attribute value. That is, the first VTEP device 110 can control the distribution of the EVPN route according to the set route synchronization control strategy as long as the role attribute carried by the EVPN route is the first role attribute value.

Thus, the flow shown in FIG. 1A is completed.

In an EVPN service application, it is often required to prohibit different branch networks from accessing one another so as to maintain confidentiality and security of services. If the main VTEP device 110 synchronizes an EVPN route received from a branch VTEP device 121 to other branch VTEP devices 122, 123 without any control, it may lead to intercommunication between different branches, and that further makes it impossible to prohibit different branches from accessing one another as required.

Based on this, the flow shown in FIG. 1A in the present disclosure may be applied, and an EVPN route sent by a branch VTEP device may be added with a role attribute so as to ensure that the main VTEP device can control the distribution of the EVPN route. Thus, it may be effectively avoided that the main VTEP device synchronizes an EVPN route received from a branch VTEP device to all other branch VTEP devices without any control, thereby effectively improving confidentiality and security of services.

In an example of the present disclosure, before the flow shown in FIG. 1A is executed, the branch VTEP devices 121, 122, 123 may recognize which VTEP device is the main VTEP device 110 first so as to send EVPN routes to the main VTEP device 110, and each of the EVPN routes sent to the main VTEP device 110 may carry a role attribute (which specifically has a first role attribute value for representing a branch role). In this way, when the above flow shown in FIG. 1A is applied, the main VTEP device 110 can control the distribution of an EVPN route based on the role attribute carried by the EVPN route only after receiving the EVPN route distributed by each of the branch VTEP devices 121, 122, 123. Regarding how the branch VTEP devices 121, 122, 123 recognize which VTEP device is the main VTEP device 110, a person skilled in the art may refer to any well-known technique. For example, each of the branch VTEP devices 121, 122, 123 may initiatively send an inquiry packet in a network after being powered up and then recognize the main VTEP device 110 based on a reply from the main VTEP device 110 to the inquiry packet. Alternatively, the main VTEP device 110 may periodically send a packet to notify the main VTEP device 110 to each of the branch VTEP devices 121, 122, 123. This will not be specifically defined herein.

In the present disclosure, the route synchronization control strategy in block 102 is mainly to appropriately prohibit distributing of some EVPN routes, which are not required to be distributed to other VTEP devices. For example, only some EVPN routes required to be distributed to other VTEP devices may be distributed according to service requirements.

In an example, at block 102, controlling the distribution of an EVPN route according to a set route synchronization control strategy may be specifically achieved in a plurality of manners. The three manners therein are shown as follows.

Figure 2:
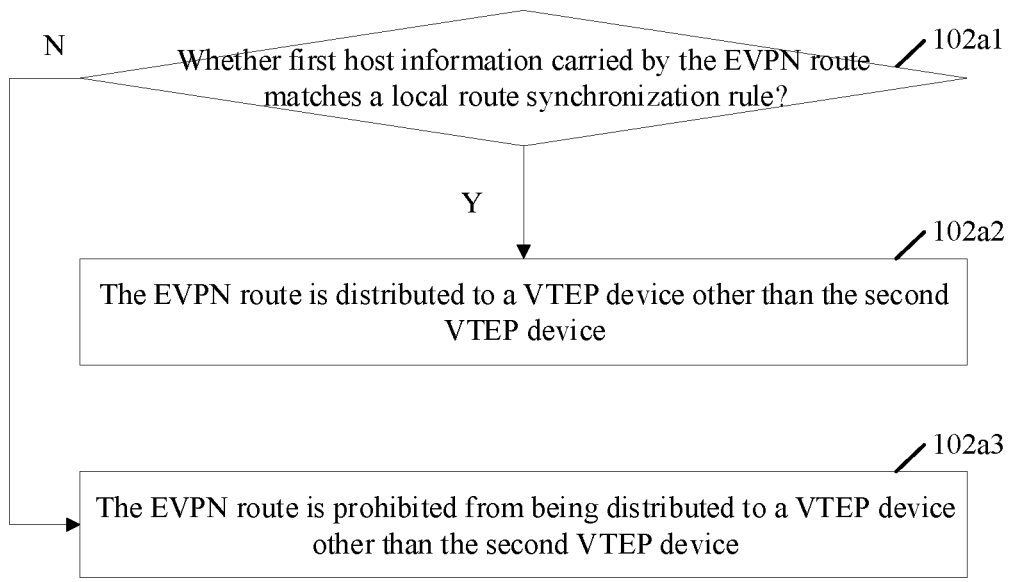
FIG. 2 is a flowchart illustrating an implementation of block 102 in the method shown in FIG. 1.

Manner 1_1:

In the manner 1_1, as shown in FIG. 2, the first VTEP device may control the distribution of the EVPN route according to the set route synchronization control strategy at block 102, which may specifically include the following blocks.

At block 102a1, whether first host information carried by the EVPN route matches a local route synchronization rule may be checked; if yes, block 102a2 may be performed; and if no, block 102a3 may be performed.

In an example, the first host information may specifically include host address information.

In another example, the route synchronization rule may be preset based on a service requirement and may contain host information such as host address information and a route distribution identifier. The route distribution identifier is used to indicate that an EVPN route carrying the host address information is allowed to be distributed.

Based on this, at the block 102a1, checking whether the first host information carried by the EVPN route matches the local route synchronization rule may include: with the first host information carried by the EVPN route as a keyword, checking whether a route synchronization rule containing the keyword is present in a local route synchronization rule table; if yes, determining that the first host information carried by the EVPN route matches the local route synchronization rule; otherwise, determining that the first host information carried by the EVPN route does not match the local route synchronization rule.

At block 102a2, the EVPN route may be distributed to VTEP devices other than the second VTEP device.

At block 102a3, the EVPN route may be prohibited from being distributed to VTEP devices other than the second VTEP device.

It can be seen from block 102a1 to block 102a3 with reference to FIG. 1B, in the manner 1_1, the main VTEP device 110 may control the distribution of the EVPN route from the branch VTEP device 121 according to the route synchronization rule rather than distributing the EVPN route received from the branch VTEP device 121 to other branch VTEP devices 122, 123 without control. In this way, service confidentiality, service security and the like between branches can be maintained.

Thus, the description of the manner 1_1 is completed.

Manner 1_2:

Compared with the manner 1_1, in the manner 1_2, the route synchronization rule may not be set on the first VTEP device 110 but on a server 130 to which the first VTEP device is connected. Based on FIG. 1B, FIG. 3B illustrates an application network of the manner 1_2 with the main VTEP device 110 as the first VTEP device, the branch VTEP device 121 as the second VTEP device, and the route synchronization rule being stored in the server 130.

Figure 3A:
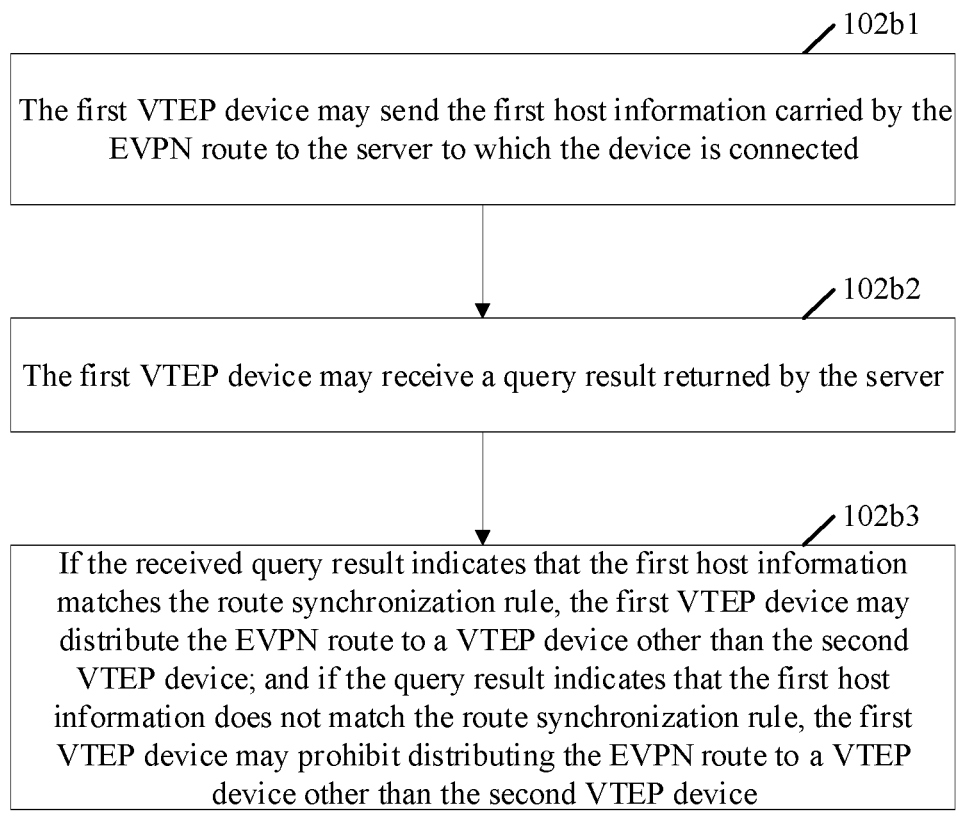
FIG. 3A is a flowchart illustrating another implementation of block 102 in the method shown in FIG. 1.
Figure 3B:
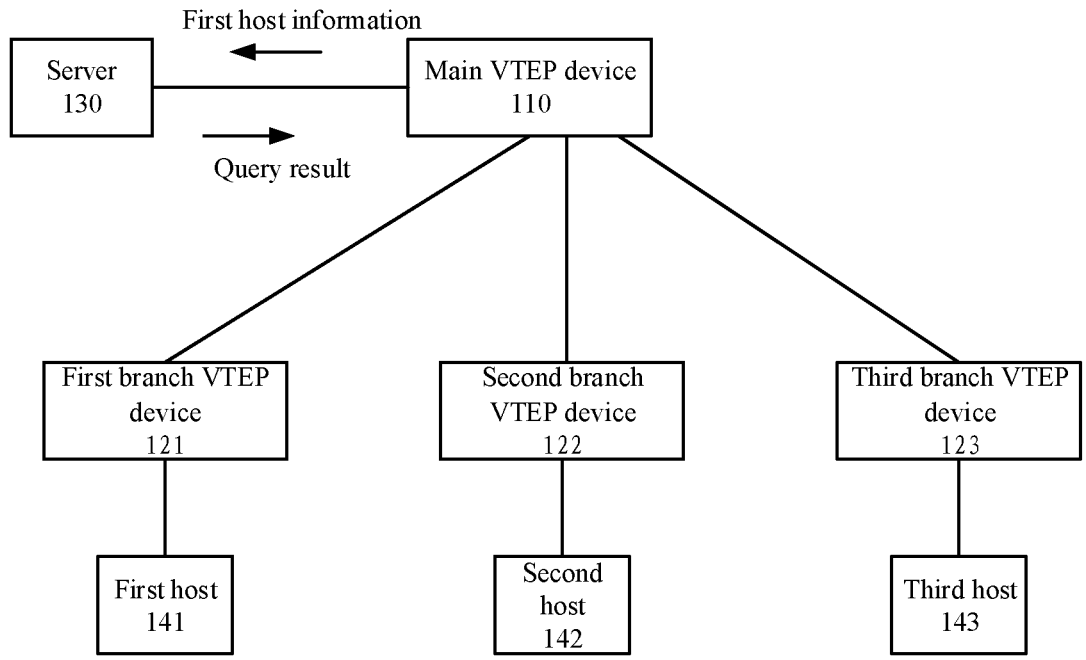
FIG. 3B is a schematic diagram illustrating an application network for the implementation shown in FIG. 3A according to the present disclosure.

In the manner 1_2, as shown in FIG. 3A, the first VTEP device may control the distribution of the EVPN route according to the set route synchronization control strategy at block 102, which may specifically include the following blocks.

At block 102b1, the first VTEP device 110 may send the first host information carried by the EVPN route to the server 130 to which the device 110 is connected so as to trigger the server 130 to query whether the first host information matches the set route synchronization rule.

In the manner 1_2, a route synchronization rule may be preset in the above server 130 based on a service requirement and the set route synchronization rule may contain host information such as a host IP address and a route distribution identifier. The route distribution identifier is used to indicate the EVPN route carrying the host information is allowed to be distributed.

At block 102b2, the first VTEP device 110 may receive a query result returned by the server.

At block 102b3, if the received query result indicates that the first host information matches the route synchronization rule, the first VTEP device 110 may distribute the EVPN route to other VTEP devices 122, 123; and if the query result indicates that the first host information does not match the route synchronization rule, the first VTEP device 110 may prohibit distributing the EVPN route to other VTEP devices 122, 123.

Similar to the manner 1_1, it can be seen from block 102b1 to block 102b3 that in the manner 1_2, the main VTEP device 110 may query the server 130 to control the distribution of the EVPN route from the branch VTEP device 121 according to the route synchronization rule rather than distributing the EVPN route received from the branch VTEP device 121 to other branch VTEP devices 122, 123 without control. In this way, service confidentiality, service security and the like between branches can be maintained.

Thus, the description of the manner 1_2 is completed.

In an example, in the manner 1_1 or the manner 1_2, the route synchronization rule may be further detailed, and the route synchronization rule may further include an identifier of a network to which the EVPN route is to be distributed, such as an identifier of a branch network, and the like.

Based on this, in the above manner 1_1 or manner 1_2, the first VTEP device may distribute the EVPN route to VTEP devices other than the second VTEP device, which may specifically include: determining a network identifier in the route synchronization rule matching the first host information; and distributing the EVPN route to a VTEP device in a network corresponding to the network identifier. In this way, it may further be detailed that the first VTEP device controls, as required, the EVPN route to be distributed to which VTEP devices of which networks.

In an example, distributing the EVPN route to the VTEP device in the network corresponding to the network identifier may specifically include: deleting the first role attribute value carried in the EVPN route and distributing the EVPN route with the first role attribute value being deleted to the VTEP device in the network corresponding to the network identifier.

In another example, distributing the EVPN route to the VTEP device in the network corresponding to the network identifier may specifically include: replacing the first role attribute value carried in the EVPN route with a second role attribute value and distributing the EVPN route obtained by the replacement to the VTEP device in the network corresponding to the network identifier.

Manner 1_3

Compared with the manner 1_1 and the manner 1_2 as above, the manner 1_3 is simpler and the EVPN route may be directly prohibited from being distributed to VTEP devices other than the second VTEP device.

In the manner 1_3, the first VTEP device may control the distribution of the EVPN route according to the set route synchronization control strategy at block 102, which may specifically include: prohibiting distributing the EVPN route to VTEP devices other than the second VTEP device.

That is, in the manner 1_3, with reference to FIG. 1B, after receiving the EVPN route from the second VTEP device 121, the first VTEP device 110 may directly prohibit distributing the EVPN route to other VTEP devices 122, 123 so as to ensure security and confidentiality of network. Of course, the first VTEP device 110 may subsequently distribute the EVPN route as required based on a route request, which may be detailed in the following description.

Thus, the description of the manner 1_3 is completed.

It needs to be noted that, with reference to FIG. 1B, when the first VTEP device 110 prohibits the EVPN route sent by the second VTEP device 121 from being distributed to other VTEP devices 122, 123, subsequently, there may be a service requirement that the host (hereinafter referred to as a second host 142) to which the third VTEP device 122 is connected accesses the host (hereinafter referred to as a first host 141) to which the second VTEP device 121 is connected. Herein, the third VTEP device 122 and the second VTEP device 121 may reside on different networks such as different branch networks. For convenience of description, the second VTEP device 121 may be a VTEP device in a first network, and the third VTEP device 122 may be a VTEP device in a second network.

To meet this service requirement, in an example, the present disclosure provides the following two manners in which the second host accesses the first host.

Figure 4:
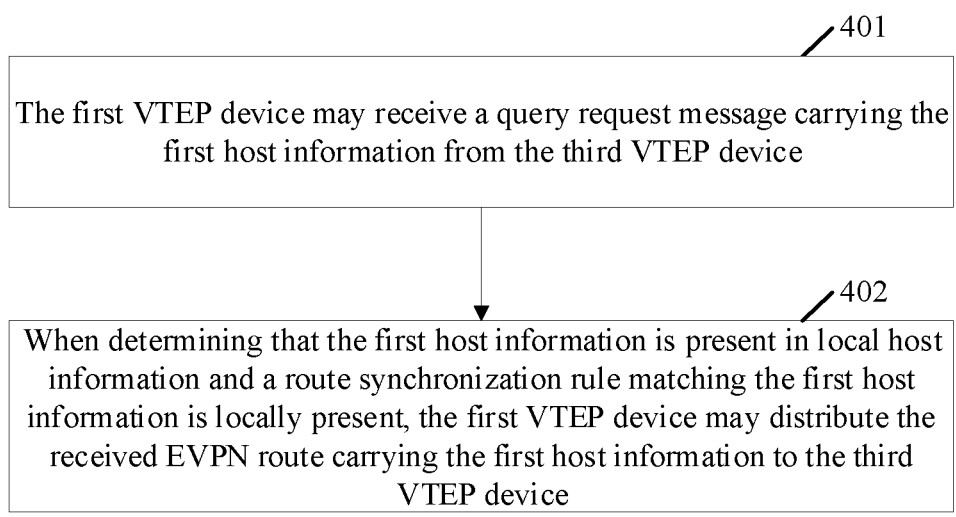
FIG. 4 is a flowchart illustrating a method of accessing a host after route control according to the present disclosure.

Manner 2_1:

In the manner 2_1, with reference to FIG. 1B and FIG. 4, after the first VTEP device 110 prohibits the EVPN route sent by the second VTEP device 121 from being distributed to other VTEP devices 122, 123, achieving accessing of the second host 142 to the first host 141 may include the following blocks.

At block 401, the first VTEP device 110 may receive a query request message carrying the first host information from the third VTEP device 122. The query request message is sent because the third VTEP device 122 has no EVPN route corresponding to the first host 141 when the second host 142 connected with the third VTEP device 122 intends to access the first host 141.

In the present disclosure, when the second host 142 is to access the first host 141, the third VTEP device 122 to which the second host 142 is connected may send the query request message to the first VTEP device 110. The query request message may carry the first host information such as a host IP address. The first host information may be obtained by the third VTEP device 122 from a Domain Name System (DNS) server before the query request message is sent.

At block 402, when determining that the first host information is present in local host information and a route synchronization rule matching the first host information is locally present, the first VTEP device 110 may distribute the received EVPN route carrying the first host information to the third VTEP device.

Specifically, in an example, distributing the received EVPN route carrying the first host information to the third VTEP device as described above may include: deleting the first role attribute value carried in the received EVPN route carrying the first host information and distributing the EVPN route with the first role attribute value being deleted therefrom to the third VTEP device.

In another example, the distributing the received EVPN route carrying the first host information to the third VTEP device as described above may include: modifying the first role attribute value carried in the received EVPN route carrying the first host information to a second role attribute value and distributing the EVPN route with the modified role attribute value to the third VTEP device. When the role attribute carried by the EVPN route is the second role attribute value, it is indicated that the distribution of the EVPN route does not need to be controlled. Therefore, it is realized that the first VTEP device distributes EVPN routes according to a uniform principle.

After receiving the EVPN route distributed by the first VTEP device 110, the third VTEP device 122 may establish a VXLAN tunnel with the first VTEP device 110, and may generate a forwarding entry according to the received EVPN route and then distribute the forwarding entry to a local forwarding table, so as to guide packet forwarding for the second host 142 to access the first host 141 subsequently. Thus, it is realized that the second host 142 accesses the first host 141.

Thus, the description of the manner 2_1 is completed.

Manner 2_2:

Compared with the manner 2_1, the manner 2_2 may require that after receiving an EVPN route from any VTEP device, the first VTEP device registers the host information carried in the received EVPN route on a server to which the first VTEP device is connected.

Based on this, the first VTEP device receives the EVPN route from the second VTEP device at block 101 as described above, which may further include: registering the first host information carried by the EVPN route on a server to which the first VTEP device is connected. Based on FIG. 1B, FIG. 5B illustrates an application network of the manner 2_2 with the main VTEP device 110 as the first VTEP device, a branch VTEP device 121 as the second VTEP device and a branch VTEP device 122 as the third VTEP device.

Figure 5A:
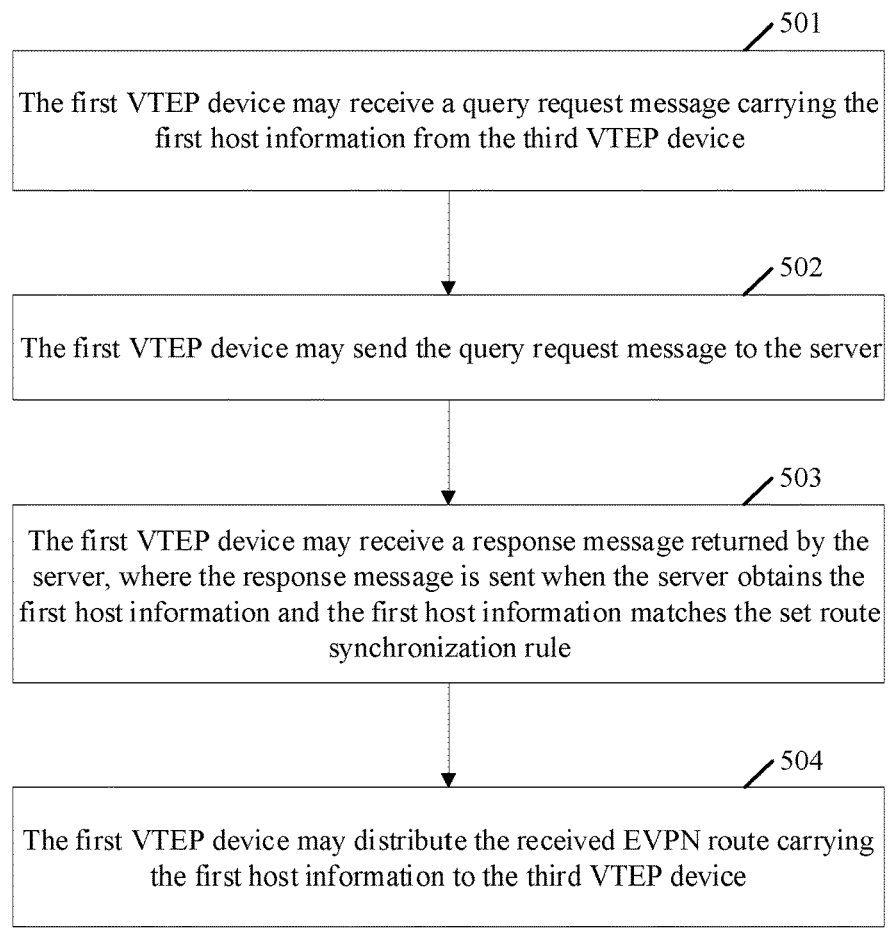
FIG. 5A is a flowchart illustrating another method of accessing a host after route control according to the present disclosure.
Figure 5B:
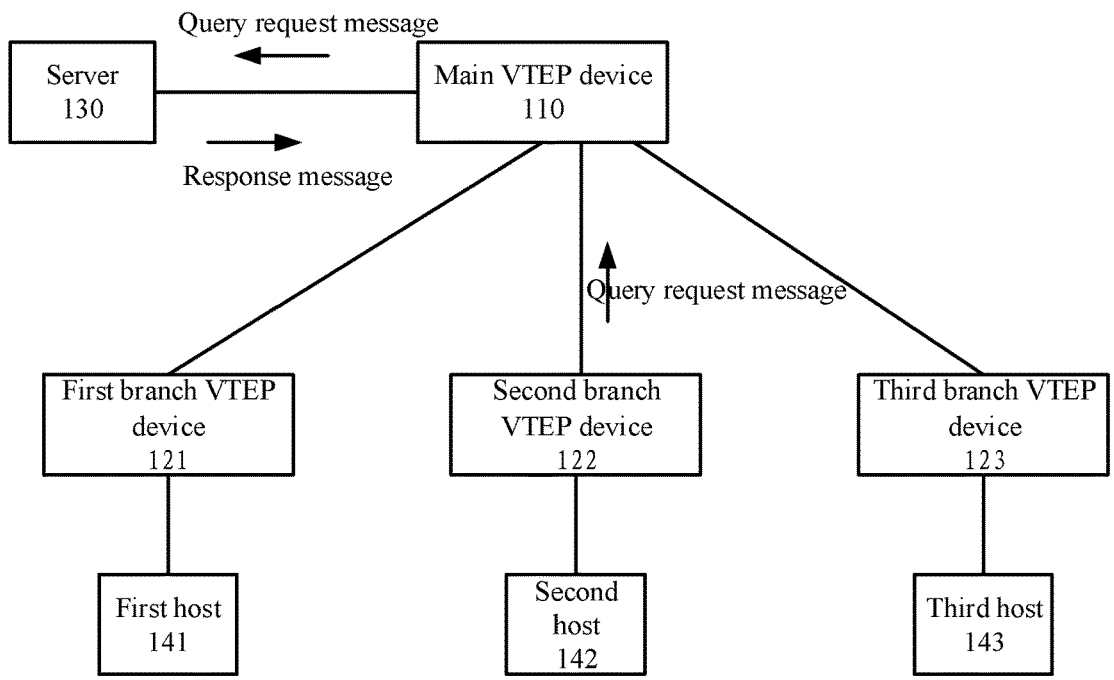
FIG. 5B is a schematic diagram illustrating an application network for the method shown in FIG. 5A according to the present disclosure.

When the manner 2_2 is applied, as shown in FIG. 5A, achieving accessing of the second host to the first host may include the following blocks.

At block 501, the first VTEP device 110 may receive a query request message carrying the first host information from the third VTEP device 122, where the query request message is sent because the third VTEP device 122 has no EVPN route corresponding to the first host 141 when the second host 142 connected with the third VTEP device 122 accesses the first host 141.

At block 502, the first VTEP device 110 may send the query request message to the server 130 to trigger the server 130 to query the first host information in the registered host information.

At block 503, the first VTEP device 110 may receive a response message returned by the server 130, where the response message is sent when the server 130 obtains the first host information and the first host information matches the set route synchronization rule.

As can be seen from FIG. 5B, in the manner 2_2, either the host information carried by the EVPN or the route synchronization rule may be stored on the server 130. Therefore, compared with the manner 2_1, the manner 2_2 may save of resources of the main VTEP device 110 greatly.

At block 504, the first VTEP device 110 may distribute the received EVPN route carrying the first host information to the third VTEP device 122.

Specifically, in an example, distributing the received EVPN route carrying the first host information to the third VTEP device as described above may include: deleting the first role attribute value carried in the received EVPN route carrying the first host information and distributing the EVPN route with the first role attribute value being deleted to the third VTEP device.

In another example, the distributing the received EVPN route carrying the first host information to the third VTEP device as described above may include: modifying the first role attribute value carried in the received EVPN route carrying the first host information to a second role attribute value and distributing the EVPN route with the modified role attribute value to the third VTEP device. When the role attribute carried by the EVPN route is the second role attribute value, it is indicated that the distribution of the EVPN route does not need to be controlled. Therefore, it is realized that the first VTEP device distributes EVPN routes according to a uniform principle.

With reference to FIG. 5B, after receiving the EVPN route distributed by the first VTEP device 110, the third VTEP device 122 may establish a VXLAN tunnel with the first VTEP device 110, and may generate a forwarding entry according to the received EVPN route and then distribute the forwarding entry to a local forwarding table for guiding packet forwarding for the second host 142 to access the first host 141 subsequently. Thus, it is realized that the second host 142 accesses the first host 141.

Thus, the description of the manner 2_2 is completed.

It needs to be noted that, to further confirm whether the third VTEP device really needs the EVPN route sent by the second VTEP device, in the above manner 2_1 or manner 2_2, before the first VTEP device distributes the received EVPN route carrying the first host information to the third VTEP device, the following is also included: sending a response message to the third VTEP device; receiving a reply packet sent by the third VTEP device based on the response message, where the reply packet carries the first host information; and obtaining the first host information from the received reply packet, and then continuing to distribute the received EVPN route carrying the first host information to the third VTEP device. In an example, the reply packet may be a refresh packet in the EVPN.

The method provided in the present disclosure will be described below with one specific example.

Figure 6:
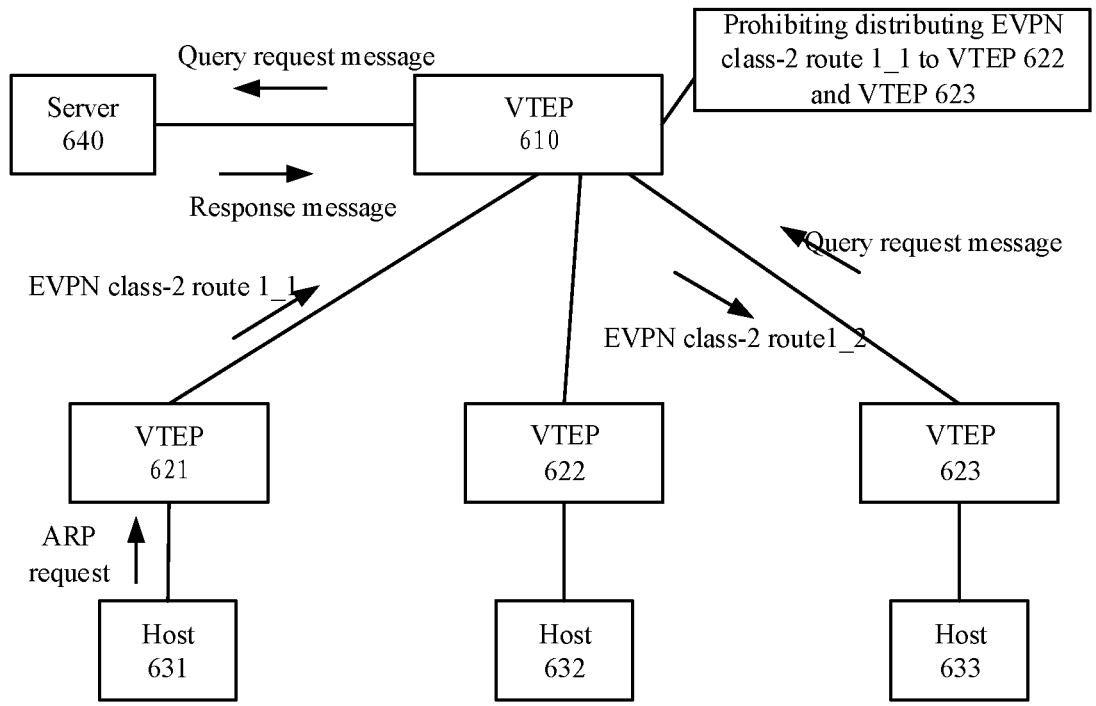
FIG. 6 is a schematic diagram illustrating an example of the present disclosure.

FIG. 6 is a diagram illustrating an application network according to an example of the present disclosure. In FIG. 6, a main VTEP device 610 may be connected with a server 640; a branch VTEP device 621 in a first branch may be connected with a first host 631; a branch VTEP device 622 in a second branch may be connected with a second host 632; and a branch VTEP device 623 in a third branch may be connected with a third host 633.

The first branch is taken for example herein, and the principles of the second branch and the third branch are similar to that of the first branch.

As shown in FIG. 6, the first host 631 in the first branch may send an ARP request. A source IP address of the ARP request is the IP address (10.10.2.1/32) of the first host 631.

The branch VTEP device 621 may receive the ARP request and learn an ARP entry corresponding to the host 631 based on the APR request. The ARP entry may include the IP address (10.10.2.1/32) and an egress port of the first host 631, the egress port being a port via which the branch VTEP device 621 is connected with the host 631.

Since the branch VTEP device 621 is deployed with the EVPN, the branch VTEP device 621 may generate an EVPN route (e.g., an EVPN class-2 route, denoted as EVPN class-2 route 1_1) corresponding to the IP address of the host 631, where the EVPN class-2 route 1_1 includes the host information of the host 631 (e.g., the IP address 10.10.2.1/32 of the host 631).

Since the branch VTEP device 621 belongs to the first branch, the branch VTEP device 621 may add a first role attribute value (e.g., 1) for representing a branch role into the generated EVPN class-2 route 1_1.

The branch VTEP device 621 may send the EVPN class-2 route 1_1 to the main VTEP device 610. Next hop of the EVPN class-2 route 1_1 is the branch VTEP device 621.

After receiving the EVPN class-2 route 1_1 from the branch VTEP device 621, the main VTEP device 610 may determine the role attribute carried by the received EVPN class-2 route 1_1 is the first role attribute value (e.g., 1) for representing the branch role. Then the received EVPN class-2 route 1_1 may be prohibited being distributed to the branch VTEP device 622 and the branch VTEP device 623 as shown in the above manner 1_3. Thus, the host 632 (IP address 10.10.3.1/32) in the second branch and the host 633 (IP address 10.10.4.1/32) in the third branch cannot access the host 631 (IP address 10.10.2.1/32) in the first branch. In this way, it is realized that all EVPN class-2 routes in the branches are distributed to the main VTEP device 610 and the main VTEP device 610 controls the received EVPN class-2 routes not to be distributed to other branches. It needs to be noted that, in the example, the main VTEP device 610 may control the distribution of the EVPN class-2 route 1_1 in the above manner 1_3, and the principle of the manner 1_3 is similar to those of the above manner 1_1 and the manner 1_2, which will not be described redundantly.

Subsequently, any two branches may be desired to communicate with each other as required, for example, it is assumed that communication of the third branch and the first branch are desired, i.e., the host 633 (IP address 10.10.4.1/32) in the third branch intends to access the host 631 (IP address 10.10.2.1/32) in the first branch. Take the above manner 2_2 for example, after receiving an EVPN class 2 route from the branch VTEP device 621, the above main VTEP device 610 may further register the IP address 10.10.2.1/32 of the host 631 in the EVPN class-2 route on the server 640 connected to the main VTEP device 610. It needs to be noted that, in the example, the main VTEP device 610 may realize the communication of the third branch and the first branch by using the above manner 2_2, which is similar to the above manner 2_1 in principal and will not be described redundantly.

Then, the branch VTEP device 623 may send a query request message the main VTEP device 610, where the query request message carries the IP address 10.10.2.1/32 of the host 631.

The main VTEP device 610 may receive the query request message and forward the message to the server 640 connected to the main VTEP device 610.

The server 640 may receive the query request message and search for the IP address of the host 631 in all host IP addresses registered on the server 640.

If obtaining the IP address of the host 631 and determining that the IP address of the host 631 matches a route synchronization rule locally set in the server 640, the server 640 may send a response message to the main VTEP device 610. The route synchronization rule may contain the IP address of the host 631, and an identifier allowing an EVPN class-2 route (i.e., the above EVPN class 2 route 1_1) corresponding to the IP address of the host 631 to be distributed to the branch VTEP device 623.

The main VTEP device 610 may receive the response message and forward the received response message to the branch VTEP device 623.

After receiving the response message, the branch VTEP device 623 may send an extended refresh packet to the main VTEP device 610, where the refresh packet carries the IP address of the host 631.

After receiving the refresh packet, the main VTEP device 610 may modify the role attribute of the EVPN class-2 route (i.e., the above EVPN class 2 route 1_1) corresponding to the IP address of the host 631 carried by the refresh packet from the first role attribute value (e.g., 1) to the second role attribute value (e.g., 0) representing the main VTEP device and then send the route to the branch VTEP device 623. For convenience of description, the EVPN class-2 route 1_1 with the modified role attribute is denoted as EVPN class-2 route 1_2.

The branch VTEP device 623 may generate a VXLAN tunnel from the branch VTEP device 623 to the main VTEP device 610 after receiving the EVPN class-2 route 1_2, and generate a forwarding entry according to the EVPN class-2 route 1_2 and distribute the forwarding entry to a local forwarding table to guide packet forwarding for the host 633 in the third branch to access the host 631 in the first branch.

Similarly, if communication of the third branch and the first branch is desired and the host 631 (IP address 10.10.2.1/32) in the first branch is to access the host 633 (IP address 10.10.4.1/32) in the third branch, the followings will be performed as shown in the above manner 2_2.

The branch VTEP device 621 may send a query request message to the main VTEP device 610, where the query request message carries the IP address 10.10.4.1/32 of the host 633.

The main VTEP device 610 may receive the query request message and forward the query request message to the server 640 connected to the main VTEP device 610.

The server 640 may receive the query request message and search for the IP address of the host 633 in all host IP addresses registered on the server 640.

If obtaining the IP address of the host 633 and determining that the IP address of the host 633 matches a route synchronization rule locally set in the server 640, the server 640 may send a response message to the main VTEP device 610. The route synchronization rule contains the IP address of the host 633, and an identifier allowing an EVPN class-2 route (denoted as the above EVPN class 2 route 1_3) corresponding to the IP address of the host 633 to be distributed to the branch VTEP device 621.

The main VTEP device 610 may receive the response message and forward the received response message to the branch VTEP device 621.

After receiving the response message, the branch VTEP device 621 may send an extended refresh packet to the main VTEP device 610, where the refresh packet carries the IP address of the host 633.

After receiving the refresh packet, the main VTEP device 610 may modify the role attribute of the EVPN class-2 route (i.e., the above EVPN class 2 route 1_3) corresponding to the IP address of the host 633 carried by the refresh packet from the first role attribute value (e.g., 1) to the second role attribute value (e.g., 0) representing the main VTEP device and then send the route to the branch VTEP device 621. For convenience of description, the EVPN class-2 route 1_3 with the modified role attribute is denoted as EVPN class-2 route 1_4.

The branch VTEP device 621 may generate a VXLAN tunnel from the branch VTEP device 621 to the main VTEP device 610 after receiving the EVPN class-2 route 1_4, and generate a forwarding entry according to the EVPN class-2 route 1_4 and distribute the forwarding entry to a local forwarding table to guide packet forwarding for the host 631 to access the host 633. Thus, communication of the first branch and the third branch is realized.

Thus, the description of the example is completed.

As can be seen from the above description, in the present disclosure, an EVPN class-2 route which is originally sent by the branch VTEP device 621 to the main VTEP device 610 and distributed to other branch VTEP devices 622, 623, may be synchronized only to the main VTEP device 610 rather than to the branch VTEP devices 622, 623 due to the control of the main VTEP device 610.

When different branches intend to communicate with each other, a permission of the main VTEP device 610 is required. The different branches can communicate with each other only when they have the permission of the main VTEP device 610. Thus, the security and confidentiality of an enterprise network can be guaranteed.

It needs to be noted that, in the present disclosure, to ensure that a main VTEP device such as the main VTEP device 610 may recognize a role attribute in a received EVPN route (such as an EVPN class-2 route), the main VTEP device may negotiate with each branch VTEP device over role attribute recognition capability; meanwhile, the main VTEP device may advertise the role attribute (the second role attribute value for presenting the main VTEP device) of the main VTEP device to each branch VTEP device; each branch VTEP device may advertise the role attribute thereof (the first role attribute value for representing the branch role) to the main VTEP device; and the main VTEP device may record the role attributes of each branch VTEP device.

The above are descriptions of the method provided in the present disclosure. A device provided in the present disclosure will be described below.

Figure 7:
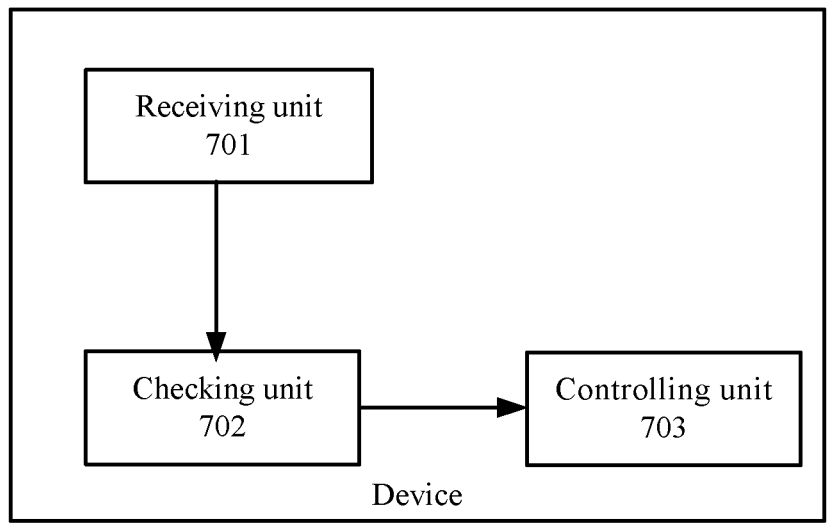
FIG. 7 is a schematic diagram illustrating a structure of a device according to an example of the present disclosure.

FIG. 7 is a schematic diagram illustrating a structure of a device according to an example of the present disclosure. The device may be applied to a main VTEP device on a backbone network as shown in FIG. 1B, FIG. 3B, FIG. 5B and FIG. 6 and include:

a receiving unit 701 configured to receive an EVPN route from a second VTEP device;

a checking unit 702 configured to check whether the EVPN route carries a role attribute; and a controlling unit 703 configured to control distribution of the EVPN route according to a set route synchronization control strategy when the checking unit 702 determines that the EVPN route carries the role attribute and the carried role attribute is a specified first role attribute value.

According to an example, the controlling unit 703 may control the distribution of the EVPN route according to the set route synchronization control strategy, which may specifically include: sending first host information carried by the EVPN route to a server connected to the device to trigger the server to query whether the first host information matches a set route synchronization rule; receiving a query result returned by the server; distributing the EVPN route to a VTEP device other than the second VTEP device if the query result is a first query result identifier representing that the first host information matches the route synchronization rule; and prohibiting distributing the EVPN route to a VTEP device other than the second VTEP device if the query result is a second query result identifier representing that the first host information does not match the route synchronization rule.

According to another example, the controlling unit 703 may control the distribution of the EVPN route according to the set route synchronization control strategy, which may specifically include: checking whether the first host information carried by the EVPN route matches a local route synchronization rule; if yes, distributing the EVPN route to a VTEP device other than the second VTEP device; and if no, prohibiting distributing the EVPN route to a VTEP device other than the second VTEP device.

According to an example, the controlling unit 703 may distribute the EVPN route to a VTEP device other than the second VTEP device, which may specifically include: determining a network identifier in the route synchronization rule matching the first host information; and distributing the EVPN route to a VTEP device in a network corresponding to the network identifier.

According to yet another example, the controlling unit 703 may control the distribution of the EVPN route according to the set route synchronization control strategy, which may specifically include: prohibiting distributing the EVPN route to a VTEP device other than the second VTEP device.

According to an example, the receiving unit 701 may receive the EVPN route from the second VTEP device, which may further include: registering the first host information carried by the EVPN route on the server connected to the device. In this case, the receiving unit 701 may further receive a query request message from a third VTEP device, where the query request message is sent because a second host connected to the third VTEP device accesses a first host when the EVPN route is not locally present in the third VTEP device; and the first host is a host corresponding to the first host information carried by the EVPN route, and the query request message carries the first host information. The controlling unit 703 may further send the query request message to the server to trigger the server to query the first host information carried by the query request message in registered host information. The receiving unit 701 may further receive a response message returned by the server, where the response message is sent when the server obtains the first host information and the first host information matches the set route synchronization rule. The controlling unit 703 may further distribute the received EVPN route carrying the first host information to the third VTEP device.

According to an example, the receiving unit 701 may further receive the query request message from the third VTEP device, where the query request message is sent because the second host connected to the third VTEP device accesses the first host when the EVPN route is not locally present in the third VTEP device; the first host is a host corresponding to the first host information carried by the EVPN route; and the query request message carries the first host information. In this case, the controlling unit 703 may further distribute the received EVPN route carrying the first host information to the third VTEP device when determining that the first host information carried by the query request message is present in local host information and that a route synchronization rule matching the first host information is locally present.

In an example of the present disclosure, before the controlling unit 703 distributes the received EVPN route carrying the first host information to the third VTEP device, the following may be further included: sending a response message to the third VTEP device; receiving a reply packet sent by the third VTEP device based on the response message, where the reply packet carries the first host information; and obtaining the first host information from the received reply packet, and then continuing to distribute the received EVPN route carrying the first host information to the third VTEP device.

Thus, the description of the device provided in the present disclosure is completed.

Figure 8:
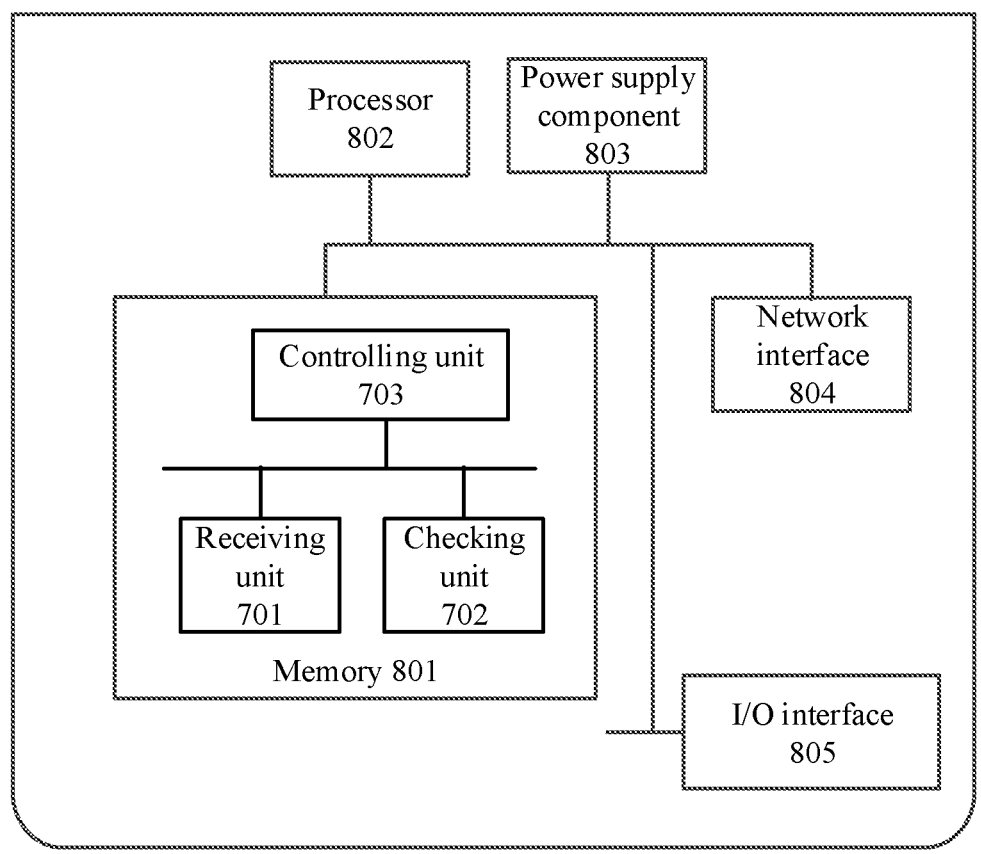
FIG. 8 is a schematic diagram illustrating a hardware structure of the device shown in FIG. 5 according to the present disclosure.

Correspondingly, the present disclosure also provides a hardware structure of a device illustrated in FIG. 8. FIG. 8 is a schematic diagram illustrating a hardware structure according to the present disclosure. As shown in FIG. 8, the device may include:

a memory 801 configured to store program instructions; and a processor 802 configured to execute the program instructions stored in the memory to perform the operations as performed by the receiving unit 701 above, the operations as performed by the checking unit 702 above, and the operations as performed by the controlling unit 703 above.

As shown in FIG. 8, the hardware structure may also include a power supply component 803 configured to execute power management for the device, a wired or wireless network interface 804 configured to connect the device to a network, and an input/output (I/O) interface 805.

Thus, the description of the hardware structure illustrated in FIG. 8 is completed.

The foregoing are merely descriptions of preferred examples of the present disclosure and not intended to limit the present disclosure. Any modifications, equivalent substitutions, adaptations and the like made within the spirit and principles of the present disclosure shall be encompassed in the scope of protection of the present disclosure.

The invention claimed is:

1. A method of controlling an Ethernet Virtual Private Networks (EVPN) route, comprising:
    receiving, by a first Virtual eXtensible Local Area Network Tunnel End Point (VTEP) device, an EVPN route from a second VTEP device;
    checking, by the first VTEP device, whether the EVPN route carries a role attribute; and
    controlling, by the first VTEP device, distribution of the EVPN route according to a set route synchronization control strategy when determining that the EVPN route carries a role attribute and the carried role attribute has a specified first role attribute value.

2. The method according to claim 1, wherein controlling the distribution of the EVPN route according to the set route synchronization control strategy comprises:
    sending, by the first VTEP device, first host information carried by the EVPN route to a server connected to the device;
    receiving, by the first VTEP device, a query result returned by the server;
    distributing, by the first VTEP device, the EVPN route to a VTEP device other than the second VTEP device when the query result indicates that the first host information matches a set route synchronization rule; and
    prohibiting, by the first VTEP device, distributing the EVPN route to a VTEP device other than the second VTEP device when the query result indicates that the first host information does not match the set route synchronization rule.

3. The method according to claim 1, wherein controlling the distribution of the EVPN route according to the set route synchronization control strategy comprises:
    checking, by the first VTEP device, whether first host information carried by the EVPN route matches a route synchronization rule locally stored in the device;
    distributing, by the first VTEP device, the EVPN route to a VTEP device other than the second VTEP device when the first host information matches the route synchronization rule; and
    prohibiting, by the first VTEP device, distributing the EVPN route to a VTEP device other than the second VTEP device when the first host information does not match the set route synchronization rule.

4. The method according to claim 2, wherein distributing the EVPN route to the VTEP device other than the second VTEP device comprises:
    determining, by the first VTEP device, a network identifier in the set route synchronization rule matching the first host information carried by the EVPN route; and
    distributing, by the first VTEP device, the EVPN route to a VTEP device in a network corresponding to the network identifier.

5. The method according to claim 1, wherein controlling the distribution of the EVPN route according to the set route synchronization control strategy comprises:
    prohibiting, by the first VTEP device, distributing the EVPN route to a VTEP device other than the second VTEP device.

6. The method according to claim 1, further comprising:
    registering, by the first VTEP device, first host information carried by the received EVPN route on a server connected to the device;
    receiving, by the first VTEP device, a query request message from a third VTEP device, wherein the query request message is sent when the EVPN route is not locally present in the third VTEP device and a first host is to be accessed by a second host; the first host is a host corresponding to the first host information; the second host is a host connected to the third VTEP device; and the query request message carries the first host information;
    sending, by the first VTEP device, the query request message to the server; and
    distributing, by the first VTEP device, the EVPN route to the third VTEP device according to a response message returned by the server, wherein the response message is sent when the server obtains the first host information from locally registered host information in response to the query request message and the first host information matches a set route synchronization rule.

7. The method according to claim 1, further comprising:
    receiving, by the first VTEP device, a query request message from a third VTEP device, wherein the query request message is sent when the EVPN route is not locally present in the third VTEP device and a first host is to be accessed by a second host; the first host is a host corresponding to first host information carried by the EVPN route; the second host is a host connected to the third VTEP device; and the query request message carries the first host information; and distributing, by the first VTEP device, the EVPN route to the third VTEP device when determining that the first host information is present in local host information and that a route synchronization rule matching the first host information is locally present.

8. The method according to claim 6, further comprising:
sending, by the first VTEP device, a response message to the third VTEP device;
receiving, by the first VTEP device, a reply packet sent by the third VTEP device based on the response message, wherein the reply packet carries the first host information; and
obtaining, by the first VTEP device, the first host information from the received reply packet.

9. The method according to claim 3, wherein distributing the EVPN route to the VTEP device other than the second VTEP device comprises:
determining, by the first VTEP device, a network identifier in the route synchronization rule matching the first host information carried by the EVPN route; and distributing, by the first VTEP device, the EVPN route to a VTEP device in a network corresponding to the network identifier.

10. The method according to claim 7, further comprising:
sending, by the first VTEP device, a response message to the third VTEP device;
receiving, by the first VTEP device, a reply packet sent by the third VTEP device based on the response message, wherein the reply packet carries the first host information; and
obtaining, by the first VTEP device, the first host information from the received reply packet.

11. A device for controlling an Ethernet Virtual Private Networks (EVPN) route, the device being applied to a first Virtual eXtensible Local Area Network Tunnel End Point (VTEP) device and comprising:
a processor; and
a non-transitory storage medium storing machine-executable instructions, wherein by reading and executing the machine-executable instructions, the processor is caused to:
receive an EVPN route from a second VTEP device;
check whether the EVPN route carries a role attribute; and
control distribution of the EVPN route according to a set route synchronization control strategy when determining that the EVPN route carries a role attribute and the carried role attribute has a specified first role attribute value.

12. The device according to claim 11, wherein, when controlling the distribution of the EVPN route according to the set route synchronization control strategy, the processor is further caused by the machine-executable instructions to:
send first host information carried by the EVPN route to a server connected to the device;
receive a query result returned by the server;
distribute the EVPN route to a VTEP device other than the second VTEP device when the query result indicates that the first host information matches a set route synchronization rule; and
prohibit distributing the EVPN route to a VTEP device other than the second VTEP device when the query result indicates that the first host information does not match a route synchronization rule.

13. The device according to claim 11, wherein, when controlling the distribution of the EVPN route according to the route synchronization control strategy, the processor is further caused by the machine-executable instructions to:
check whether first host information carried by the EVPN route matches a route synchronization rule locally stored in the device;
distribute the EVPN route to a VTEP device other than the second VTEP device when the first host information matches the route synchronization rule; and
prohibit distributing the EVPN route to a VTEP device other than the second VTEP device when the first host information does not match a route synchronization rule.

14. The device according to claim 12, wherein, when distributing the EVPN route to the VTEP device other than the second VTEP device, the processor is further caused by the machine-executable instructions to:
determine a network identifier in the route synchronization rule matching the first host information carried by the EVPN route; and
distribute the EVPN route to a VTEP device in a network corresponding to the network identifier.

15. The device according to claim 11, wherein, when controlling the distribution of the EVPN route according to the set route synchronization control strategy, the processor is further caused by the machine-executable instructions to:
prohibit distributing the EVPN route to a VTEP device other than the second VTEP device.

16. The device according to claim 11, wherein, the processor is further caused by the machine-executable instructions to:
register first host information carried by the EVPN route on a server connected to the device;
receive a query request message from a third VTEP device, wherein the query request message is sent when the EVPN route is not locally present in the third VTEP device and a first host is to be accessed by a second host; the first host is a host corresponding to the first host information; the second host is a host connected to the third VTEP device; and the query request message carries the first host information;
send the query request message to the server; and
distribute the EVPN route to the third VTEP device according to a response message received from the server, wherein the response message is sent when the server obtains the first host information from locally registered host information and the first host information matches a set route synchronization rule.

17. The device according to claim 11, wherein, the processor is further caused by the machine-executable instructions to:
receive a query request message from a third VTEP device, wherein the query request message is sent when the EVPN route is not locally present in the third VTEP device and a first host is to be accessed by a second host; the first host is a host corresponding to first host information carried by the EVPN route; the second host is a host connected to the third VTEP device; and the query request message carries the first host information; and
distribute the EVPN route to the third VTEP device when determining that the first host information is present in local host information in response to the query request message and determining that a route synchronization rule matching the first host information is locally present.

* * * * *